Sept. 22, 1959 R. BLECKMANN 2,905,801
FLANGE ASSEMBLY
Filed April 8, 1958 3 Sheets-Sheet 1
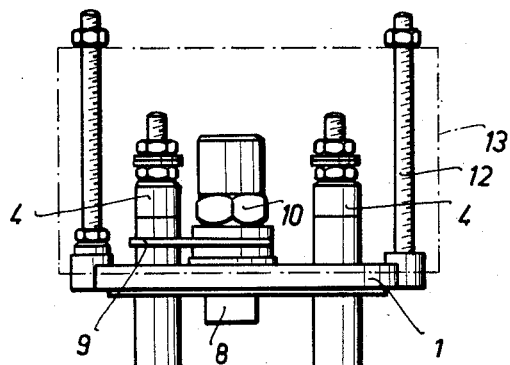
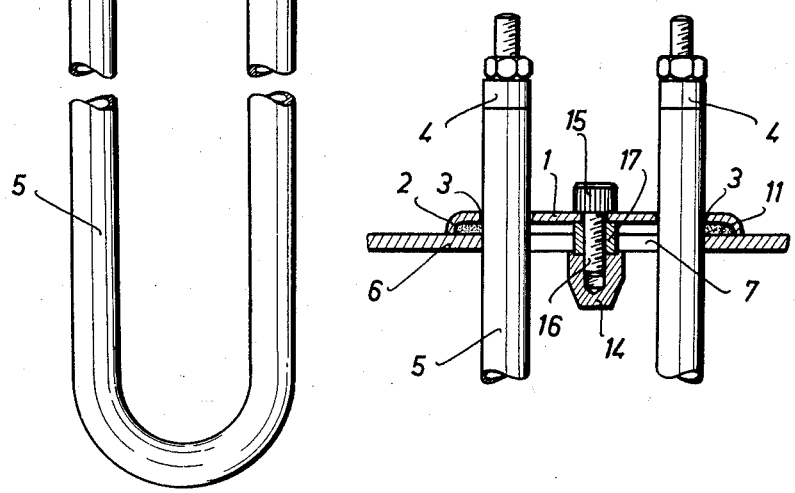
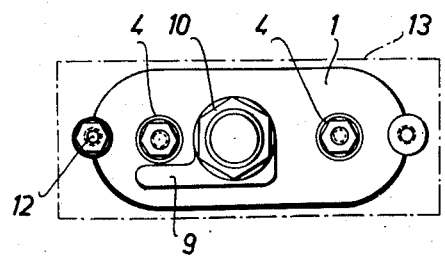

Sept. 22, 1959 R. BLECKMANN 2,905,801
FLANGE ASSEMBLY
Filed April 8, 1958 3 Sheets-Sheet 2
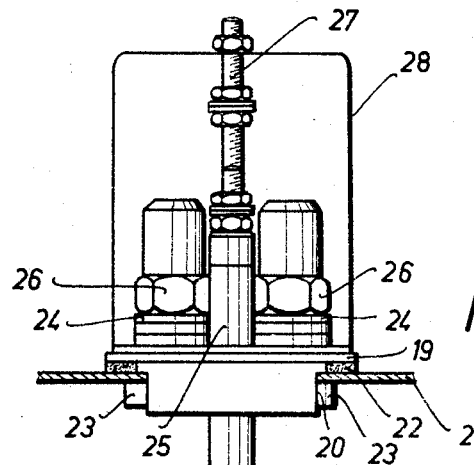
FIG.4
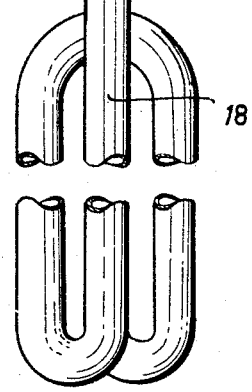
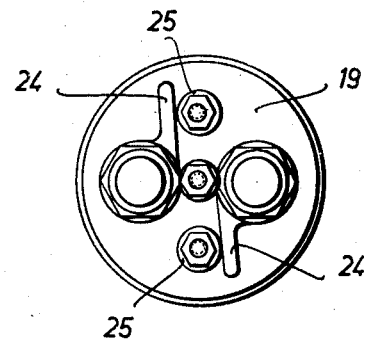
FIG.5

Sept. 22, 1959  R. BLECKMANN  2,905,801
FLANGE ASSEMBLY
Filed April 8, 1958  3 Sheets-Sheet 3
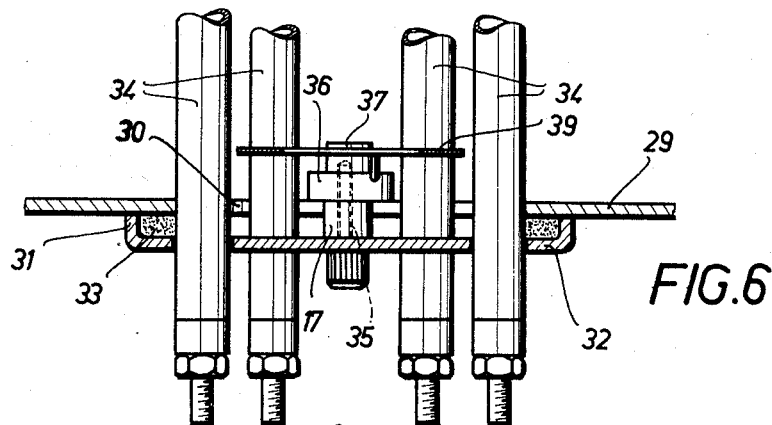
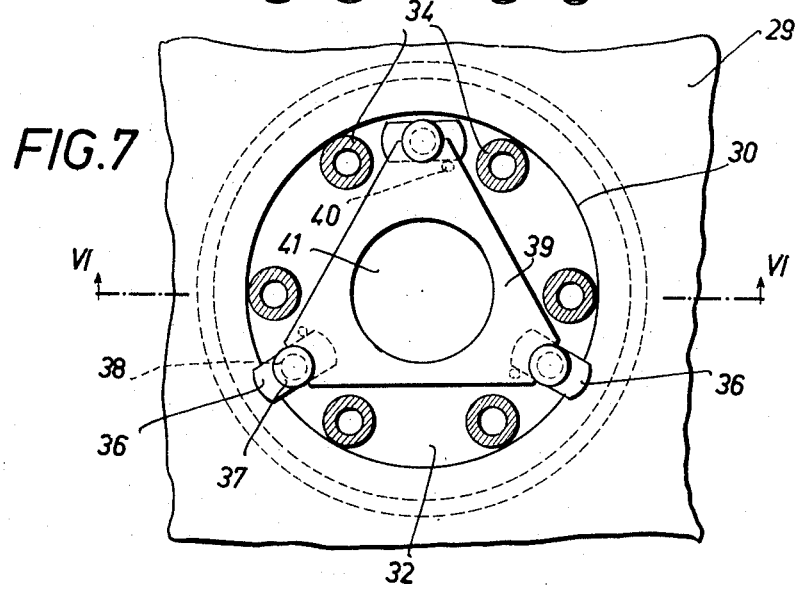

United States Patent Office

2,905,801
Patented Sept. 22, 1959

2,905,801

FLANGE ASSEMBLY

Richard Bleckmann, Salzburg, Austria

Application April 8, 1958, Serial No. 727,216

Claims priority, application Austria April 15, 1957

10 Claims. (Cl. 219—38)

This invention relates to a flange assembly which comprises a flange adapted to be applied to one side of a wall formed with an opening to overlap the edge of said opening and will be described hereinafter with special reference to such flange assembly intended for fixing electric heaters, particularly tubular heaters, to the openings of electrically heated equipment. It is an object of the invention to provide a flange of the type described, which enables the fixation of the heaters in the equipment in a predetermined position, and which can easily be mounted even where the equipment opening is easily accessible only from one side and which does not require backstays or other reinforcing parts to be affixed to the equipment wall adjacent to the opening. The flange has backstays which can be tightened against the flange and which engage the inside edge of the opening.

The flange assembly according to the invention comprises a flange adapted to be applied to one side of a wall formed with an opening to overlap the edge of said opening, and at least one screw-threaded member extending through said flange and is characterized in that each of said screw-threaded members carries a backstay which is elongated in the radial direction of said screw-threaded member and disposed on the other side of said wall when said flange is thus applied, said backstay being operatively connected to said screw-threaded member for angular movement thereby between a release position in which said backstay when viewed through said opening is clear of said wall and a locking position in which said backstay overlies said wall, and that it comprises tightening means carried by said screw-threaded member on the side of said flange opposite to said backstay and operable to force said flange and said backstay against opposite sides of said wall when said backstay is in said locking position. Stops are provided to limit the angular movement of the backstays. In smaller flange assemblies a single backstay is sufficient whereas with larger flanges, which are approximately circular, two or more backstays carried by one bolt each are used. The backstays may be tightened with the aid of the bolts against the flange so that the flange is sufficiently affixed to the equipment after it has been clamped. Owing to the construction according to the invention the flange may be easily affixed to equipment even if it is accessible only from one side. It was previously necessary in the construction of electrically heated equipment to provide for access from both sides to the fixing flanges of electrical heaters, which resulted frequently in an increase of the dimensions of the equipment, which increase was not necessary for the function of the equipment and in many cases was ever undesired for this function, and in the necessity of making individual parts of the equipment easily detachable only to provide access to the fixing flange from the interior. The use of a flange according to the invention, on the other hand, enables an arrangement of the heaters in positions whcih are difficultly accessible or inaccessible from the interior of the equipment and the provision of electric heating in many cases even for equipment in which this would not otherwise be possible. The subsequent mounting on equipment is further facilitated by the fact that only a plain opening is required in the wall of the equipment, container etc. before the mounting of the flange and additional operations are not required. The stops which prevent a rotation of the backstay beyond the desired range may consist of pins carried by the backstay and extending into the opening to engage the edge of the opening upon rotation. The backstay itself may consist of a nut or of the head of a bolt. Where several backstays are provided they may be asymmetrically shaped. For instance, a bolt having a head forming the backstay may have the form of a hook. In most cases the friction forces acting on the backstays after the bolts or nuts have been tightened are sufficient to ensure the rotation thereof into the desired position. If the backstay consists of a bolt head, the outwardly directed end of the bolt may be formed with a slot or as an Allen screw for engagement by a turning instrument. Alternatively the bolt might carry a handle formed as a lever, with the aid of which the screw head is rotatable after it has been inserted. This handle could also engage stops to prevent a rotation of the backstay. Further details and suitable developments of the invention will be apparent from the accompanying description of the accompanying drawings, in which the invention is diagrammatically shown.

Fig. 1 is an elevation showing an embodiment of a flange assembly according to the invention with a tubular heater affixed thereto.

Fig. 2 is a top plan view of the flange assembly of Fig. 1.

Fig. 3 is a sectional view showing a modification of the flange assembly of Figs. 1 and 2.

Fig. 4 is a side view showing a round flange assembly according to the invention with a tubular electric heater affixed thereto.

Fig. 5 is a top plan view of the flange assembly of Fig. 4.

Fig. 6 is a longitudinal sectional view taken on line VI—VI of Fig. 7 and showing a flange assembly for fixing several tubular electric heaters.

Fig. 7 is an internal view of the flange assembly of Fig. 6.

According to Figs. 1 to 3 the flange 1 is depressed from a bearing rim 2 and has an elongated form rounded on both longitudinal edges. Two openings 3 spaced from the ends are provided in the flange as passages for the terminal ends 4 of a tubular electric heater 5. A seal may be provided by welding or brazing the shell tube of the heater 5 to the flange 1. As is shown in Fig. 3 the housing wall 6 is formed with an opening 7 which corresponds to the peripheral contour of the flange 1 but is smaller than the same and through which the heater 5 can be passed. According to Figs. 1 and 2 a backstay in the form of an elongated screw head 8 is provided for the flange 1 and carries a screw bolt extending through the flange. A lever 9 is affixed to this bolt on the outside of the flange for rotating the bolt and with it the backstay 8. The bolt carries a nut 10, with the aid of which the bolt and backstay are tightened to force the backstay 8 against the flange. When the flange is to be applied the backstay 8 is first moved by the lever 9 to the longitudinal position indicated with broken lines in Fig. 1; in this position the backstay can be moved through the housing opening. When the backstay has been moved through the housing opening the lever 9 is pivotally moved until it engages one end of the tubular heater. By this operation the backstay 8 connected to the lever is moved to a transverse position to overlie the longitudinal edges of the opening with both ends. The nut 10 is then tightened to force the backstay against the flange. A gasket 11 (Fig. 3) is inserted in the recessed portion of the flange. According to Figs. 1 and 2 the flange 1 carries on the outside additional screw bolts 12, to which a protecting cap 13, indicated with dash-and-dot lines in the drawing, can be affixed to cover the entire flange and the terminal ends towards the outside.

According to Fig. 3 the backstay consists of an elongated nut 14, which is similar in shape to the bolt head 8 of Fig. 1 and is carried by a bolt 16 which extends through the flange 3 and has on the outside a head 15. The bolt 16 carries an annular gasket 17, which is in permanent engagement with the nut 14 and serves as a friction coupling between the bolt and the nut to carry the nut along as the bolt is rotated when the bolt is being unscrewed or untightened. Stop pins (not shown) may be provided on the nut to prevent a rotation of the nut beyond the indicated position in which both longitudinal ends of the nut engage the edges of the opening. In this position the stop pins engage the edge of the opening. The tightening of the bolt 16 with the aid of the bolt head 15, which may consist, e.g. of an Allen head, will clamp the gasket 17 between the nut 14 and the flange 1 to seal the passage opening for the bolt 16.

According to Figs. 4 and 5 a circular flange 19 is provided for fixing the heater 18. This flange can be inserted into a circular opening 20 in the housing wall 21. A gasket 22 is arranged between the flange 19 and the housing wall. In this embodiment two backstays 23 are provided for the flange. These backstays consist of bolt heads similar to that of Fig. 1. The bolt heads may have a symmetrical elongated shape or an unsymmetrical hook-like shape. Levers 24 are again provided for the pivotal movement of the backstays. In the position of engagement of the backstays these levers engage the outwardly extending ends 25 of the heater serving as stops. Nuts 26 carried by the bolts serve for clamping the backstays. The flange 19 carries a screw bolt 27, to which a protecting cap 28 can be affixed. The circular form of the flange enables a rotation of the flange and heater. The circular form has also the advantage that the opening required in the wall of the housing or container can be extremely simple and easily provided.

In the construction according to Figs. 6 and 7 a circular opening 30 is provided in the housing wall 29. The flange 32 having a raised bearing edge 31 is also of circular shape. A gasket 33 is arranged between the flange 32 and the housing wall. The flange 32 is intended for fixing three tubular heaters (six ends 34 of tubular heaters). The backstays consist of elongated nuts 36 carried by bolts 35. This is similar to the construction of Fig. 3. The bolts 35 are arranged at the corners of an equilateral triangle. When the nuts 36 are rotated from their position of rest shown at the top in Fig. 7 they come to overlie the rim of the opening (see at the bottom of Fig. 7). The nuts 36 have a cylindrical extension 37, in which an annular groove 38 is provided, which is engaged by a spacing plate 39, which is held by the three nuts and forms an abutment for taking up the forces which act on the unilaterally supported nuts during the tightening of the bolts. The spacing plate 39 is provided with stop pins 40 for the nuts. The spacing plate has an opening 41, through which the temperature feeler of a thermostat for the heaters can be inserted. Additional protective devices may be affixed to this spacing plate.

It is understood that the flange assemblies shown are only intended to illustrate the invention and that the backstays could be arranged in another distribution around the periphery of the flanges and that the flanges could have a polygonal or oval shape. Bolt heads shown as backstays could be replaced by nuts and vice versa. Slots or the like for engagement by a turning instrument could be provided in the bolt for rotating the backstay formed as a head of such bolt. It may be mentioned that the flange assembly according to the invention is not restricted in its application to the fixation of tubular heaters but may also be used with other electrical heaters or for other purposes, which will be apparent to a man skilled in the art. The flange assemblies according to Figs. 1 to 5 are particularly suitable for fixing electrical heaters in domestic appliances such as electrically heated washing machines, hot water preparing apparatus and the like. Whereas the flange according to Figs. 6 and 7 may be used with larger equipment. In this case it is also possible, however, to use flanges of larger or smaller size and to use them for equipment other than the types mentioned.

What is claimed is:

1. A flange assembly which comprises a flange adapted to be applied to one side of a wall formed with an opening to overlap the edge of said opening, at least one screw-threaded member rotatably mounted in and extending through said flange at a point which is differentially spaced from different portions of the periphery of said flange, said screw-threaded member carrying on one side of said flange an elongated backstay extending in the radial direction of said screw-threaded member and axially retained on and operatively connected to said screw-threaded member for angular movement thereby in a predetermined direction from a release position, in which said backstay extends substantially longitudinally of the portion of the periphery of said flange next to said screw-threaded member, to a locking position, in which said backstay extends substantially transversely to said portion of the periphery of said flange next to said screw-threaded member, stop means located in a predetermined position relative to said screw-threaded member and arranged to limit the angular movement of said backstay in said predetermined direction beyond said locking position, and tightening means carried by said screw-threaded member on the other side of said flange and rotatable in said predetermined direction and in the direction opposite thereto to force said backstay axially against said flange when said backstay is in said locking position, and to release said backstay axially from said flange, respectively.

2. A flange assembly as set forth in claim 1 which comprises an annular gasket disposed between said backstay and said flange and in frictional engagement with said screw-threaded member and said backstay to provide a friction coupling therebetween.

3. A flange assembly which comprises a flange adapted to be applied to one side of a wall formed with an opening to overlap the edge of said opening, at least one screw-threaded member rotatably mounted in and extending through said flange at a point which is differentially spaced from different portions of the periphery of said flange, said screw-threaded member carrying on one side of said flange an elongated backstay extending in the radial direction of said screw-threaded member and axially retained on and operatively connected to said screw-threaded member for angular movement thereby in a predetermined direction from a release position, in which said backstay extends substantially longitudinally of the portion of the periphery of said flange next to said screw-threaded member, to a locking position, in which said backstay extends substantially transversely to said portion of the periphery of said flange next to said screw-threaded member, stop means located in a predetermined position relative to said screw-threaded member, a lever nonrotatably carried by said screw-threaded member on the other side of said flange, said stop means being arranged to be engaged by said lever in said locking position of said backstay to limit the angular movement of said backstay in said predetermined direction beyond said locking position, and tightening means carried by said screw-threaded member on the other side of said flange and rotatable in said predetermined direction and in the direction opposite thereto to force said backstay axially against said flange when said backstay is in said locking position, and to release said backstay axially from said flange, respectively.

4. A wall-and-flange assembly which comprises a wall formed with an opening, a flange applied to one side of said wall and overlapping the edge of said opening, at least one screw-threaded member rotatably mounted in and extending through said flange, each of said screw-threaded members carrying on the other side of said wall an elongated backstay extending in the radial direction of said screw-threaded member and axially retained on and operatively connected to said screw-threaded member for angular movement thereby in a predetermined direction from a release position, in which said backstay when viewed through said opening is clear of said wall, to a locking position, in which said backstay overlies said wall, stop means located in a predetermined position relative to said screw-threaded member and arranged to limit the angular movement of said backstay in said predetermined direction beyond said locking position, and tightening means carried by said screw-threaded member on the side of said flange opposite to said backstay and rotatable in said predetermined direction and in a direction opposite thereto to force said flange and said backstay against opposite sides of said wall when said backstay is in said locking position and to release said backstay and flange axially from said wall, respectively.

5. A flange-and-wall assembly as set forth in claim 4, in which said stop means comprise pins carried by said backstay and extending into said opening for engagement with the edge of said opening in said locking position of said backstay.

6. A flange assembly as set forth in claim 1, in which said backstay is rigid with and extends only on one side radially from said screw-threaded member.

7. A flange assembly as set forth in claim 1, which comprises a plurality of said screw-threaded members extending through said flange at spaced positions near the periphery of said flange and in which each of said backstays is provided with an axial extension formed with a peripheral annular groove, and which comprises further a spacing plate having an edge in engagement with said grooves.

8. A flange assembly as set forth in claim 7, in which said spacing plate carries a thermostat extending therethrough.

9. A flange assembly as set forth in claim 1, which comprises a tubular heater extending through said flange and forming said stop means.

10. A flange assembly as set forth in claim 1, which comprises a plurality of said screw-threaded members extending through said flange at spaced positions near the periphery of said flange and in which each of said backstays is provided with an axial extension formed with a peripheral annular groove, and which comprises further a spacing plate carrying said stop means and having an edge in engagement with said groove.

References Cited in the file of this patent

UNITED STATES PATENTS

| | | |
|---|---|---|
| 2,401,847 | Urbant et al. | June 11, 1946 |
| 2,444,627 | Braun et al. | July 6, 1948 |
| 2,529,707 | Pierce | Nov. 14, 1950 |
| 2,550,751 | Adams | May 1, 1951 |
| 2,824,945 | Derumaux | Feb. 25, 1958 |